METHOD OF FABRICATING A SUPERCONDUCTIVE STRUCTURE

Filed Sept. 29, 1969

ALFRED P. HAMMER,
ALEXIS C. ENTZ &
CLAUDE LEVAIRE,
Inventors
by Flynn & Frishauf Attys United States Patent Office 3,626,585
Patented Dec. 14, 1971

3,626,585
METHOD OF FABRICATING A SUPERCONDUCTIVE STRUCTURE

Alfred Paul Hammer, Paris, Alexis Charles Entz, Vaucresson, and Claude Levaire, Chauny, France, assignors to Compagnie Francaise Thomson Houston-Hotchkiss Brandt, Paris, France Filed Sept. 29, 1969, Ser. No. 861,910
Claims priority, application France, Oct. 18, 1968, 170,415
Int. Cl. H01v *11/00*
U.S. Cl. 29—599 5 Claims

ABSTRACT OF THE DISCLOSURE

An elongated metallic tube has secured therein, with substantial line contact, a sheathed filamentary superconductor, having an outside diameter much less than the inside diameter of the tube; preferably the sheath metal and the metal of the tube are the same (for example copper, aluminum, or alloys thereof). According to the method, a long band is provided along the length of which the superconductor is first bonded, for example by welding, or fusing of the sheath metal to the band; thereafter, the band is folded and formed into the tube, the lateral edges of the band being seamed together to form a fluid tight seal for example by welding, cold flowing or the like.

The present invention relates to superconductors, and to a method of making the same, and more particularly to superconductor structures of substantial length with efficient cooling arrangement.

Superconductors are usually formed in sheets, tapes, or wires and it is difficult to make them in substantial length. The superconductive materials themselves usually are intermetallic compounds containing niobium, tin, vanadium, such as $Nb_3Sn$; $Nb_3Al$; $Nb_3Au$; NbTi; $V_3Si$; $V_3Ga$. The state of the superconductors is determined by their temperature and the magnetic field to which they are exposed, and when both temperature and field are below a critical value they are in superconductive state. The critical temperature and magnetic field values vary in accordance with the composition of the superconductor, and to a certain extent in accordance with their structure. The critical magnetic fields are in the order of several tens to hundred thousands oersteds. The highest critical temperatures are in the range from 15 to 18° K.

For high cooling, the superconductors are usually maintained immersed in a refrigerating fluid, such as liquid helium. As a result, the containers for refrigerating liquid are quite large and the auxiliary equipment for use with the superconductive structure is substantial. Entirely apart from the dimensions and mass of the auxiliary equipment, the cost of maintaining sufficient quantities of refrigerating liquid at low temperature is prohibitive for a large number of industrial applications. It has already been proposed to substitute for cooling by immersing, cooling of the superconductive structure by internally conducting a cooling fluid therethrough, similar to cooling of welding electrodes. When so called soft superconductors are cooled, they are usually made in tubular, or hollow form to permit this internal cooling allowing multiply-connection surfaces necessary to obtain the superconductors currents. Even so called "hard" superconductors are frequently formed in hollow, or tubular form, a shape which permits great increase in the value of the critical magnetic field.

Superconductors for internal cooling have a central bore into which superconductive fluid is introduced under pressure, or under variable flow conditions. Yet, single elementary superconductor structures, such as superconductor wires, may have only a small cross section and the resulting bore therethrough will be of insufficient size in order to permit sufficient flow for correct cooling.

Certain multiple-element superconductors are better adapted for cooling by internal flow of cooling fluid. Such superconductor structures may consist of a certain number of filamentary elements spaced from each other and surrounded by a mass of metal stabilizing their thermal conduction, the hollow superconductors each having a bore of sufficient size adapted to receive refrigerating fluid. Nevertheless, such multiple-element superconductors have fair cooling capability although a substantial amount of refrigerating fluid is required. Additionally, under present manufacturing techniques, such superconductors can be made only in comparatively short length.

It is an object of the present invention to provide a superconductor structure, and a method of making the same, which enables efficient and optimum cooling throughout a substantial length.

SUBJECT MATTER OF THE PRESENT INVENTION

Briefly, a superconductor which may be hollow is surrounded by a metallic sheath; the sheathed superconductor, itself, is inserted into a tube of preferably the same metal as the sheath, and of substantially larger internal diameter than the external diameter of the sheathed superconductor. The sheathed superconductor is connected by means of an essentially line-contact along the length of the tube. Refrigerating fluid is then introduced into the tube surrounding the superconductor. The interconnection between the superconductor and the metal of the tube may be by welding, brazing or the like, and the superconductor itself, if desired, may be hollow.

The exterior surface of the superconductive element is in constant thermal contact with the refrigerating fluid; heat exchange is thus substantial since the surface of the superconductive element over which heat exchange may obtain is great with respect to the surface of an internal bore alone.

According to a feature of the invention, the superconductor structure is made by bonding (fusing, welding or the like) the sheathed superconductor to an elongated ribbon or tape of metal which is then folded over to be formed into the tube surrounding the superconductor—the longitudinal edges of the tape or band being secured together to be fluid tight, for example by hot or cold welding, cold flowing of the metal or the like. More than one sheathed superconductor may be applied longitudinally to the tape or ribbon, so that a structure with a number of superconductors secured along the length of the tube will be obtained.

IN THE ACCOMPANYING DRAWINGS

Figure 1:
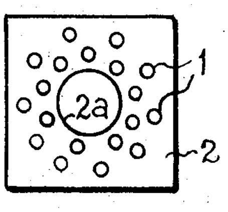
FIG. 1 PRIOR ART
FIG. 1 is a schematic cross-sectional view through a composite superconductor structure in accordance with the prior art, with the scale of the various elements arbitrarily chosen.

A superconductor structure of the type illustrated in FIG. 1, which is known, usually has a certain number of filamentary superconductor elements 1 surrounded by a metal stabilization mass 2, such as a body of aluminum, copper, or similar metal which is a good thermal conductor at the cryogenic temperatures. The body of metal has a central bore 2*a* which may be circular, polygonal, or of some other shape to pass cryogenic liquid therethrough. The best possible heat exchange between the cryogenic liquid and the superconductor elements themselves cannot be realized in this manner and superconductor structures of substantial length are difficult to make. The cooling of superconductors of this type is achieved in the known manner by circulating a refrigerating fluid, under pressure, through bore *2a*. Due, primarily, to the quite small heat exchange surface of the internal wall of bore *2a*, and the progressive decrease of the section of material available for heat transfer between superconductor elements and the central bore, the effectiveness of cooling is low and a large amount of refrigerating fluid must be circulated.

Figure 2:
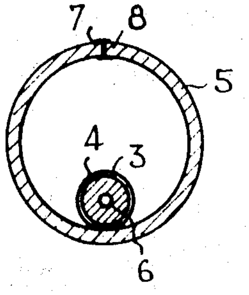
FIG. 2 is a cross-sectional transverse view, not to scale, of the superconductor structure in accordance with the present invention.

In accordance with the present invention, the superconductor, as seen in FIG. 2, is a filamentary element 3 supplied with a sleeve or sheath 4 of a stabilization metal, such as aluminum, copper, or alloys of aluminum or copper, or such other appropriate metal which it is a good thermal conductor at cryogenic temperatures. The superconductor element 3 with its sheath 4 is secured along one side, with substantially line contact to the inner wall of a tube 5. Tube 5, itself, is made of a metal which can be operated at cryogenic temperatures, and further is compatible with the sheath 4 surrounding the superconductor element, preferably of the same metal as the sheath itself. The superconductor element 3 may be single elements, or multiple elements, and the tube 5 may be of circular, or other cross-section, so long as it is fluid tight so that cryogenic refrigerating liquid will not leak therefrom.

The superconductor structure of the present invention is cooled by introducing a refrigerating liquid, under pressure, into tube 5; the fluid introduced therein may have a controlled flow rate, to control the heat transfer available. The refrigerating fluid is in contact with sheath 4 surrounding the superconductive element 3. The heat exchange surface between superconductor element 3 and the refrigerating fluid is, consequently substantial and the path for heat flux across the sheath 4, between superconductor 3, and the surrounding refrigerating fluid, is of increasing heat carrying capability. Extreme cooling rates can be obtained by making the superconductor element hollow, that is by forming a central bore 6 therein, and connecting additional refrigerating fluid to the central bore.

Figure 3:
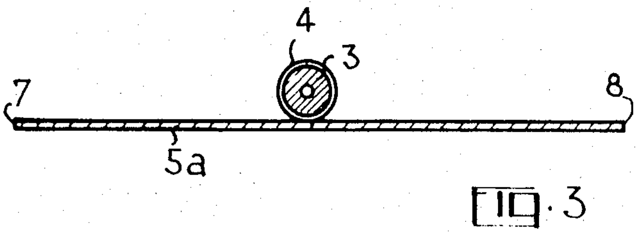
FIG. 3 illustrates a step in the manufacture of the superconductor structure.

In accordance with the feature of the invention, the superconductor just described is made by first sheathing the superconductor element 3 with a stabilization metal 4. The sheathed composite element is then placed longitudinally on a tape, or ribbon, or band material 5*a* (see FIG. 3), and the metals of the sheath 4 and of band or tape 5*a* are fused together, for example, by welding, brazing or the like, so that an essentially line contact between the superconductor and the tape will be formed. Thereafter band 5*a* is bent or folded into tubular shape to form the cylinder 5 (which may have a round, polygonal or other cross-section), the superconductor element 3 then being interior of tube 5. The longitudinal edges 7, 8 of tape 5*a* are then joined to form a tight connection, for example by welding, cold flowing, brazing, fusing or similar method. Both the welding of sheath 4 of the supercondctor element on tape 5*a* and welding together of the longitudinal edges 7, 8, can be done by cold working the metal under substantial pressure; hot fusion, with or without addition of further metal may also be used. Superconductor structures may thus be made of any length desired and having any desired dimensions. The resulting structure is form-stable and can readily be cooled.

Figure 4:
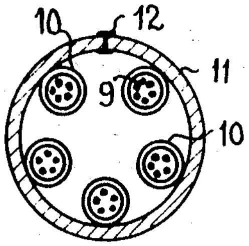
FIG. 4 is a transverse cross-sectional view, to arbitrary scale of an alternate embodiment of the invention.

In accordance with a feature of the invention, a plurality of superconductor elements 9 can be placed within a stabilization metal sleeve 10, each in turn laterally fused to the inner wall of a tube 11 (see FIG. 4). Tube 11 itself can again be made from a flat tape, with the plurality of sheathed elements located lengthwise thereof, the tape then being folded and secured at its lateral edges as seen at 12, for example by welding, so that a fluid tight seal will results. Again, the tubular body may have a circular, polygonal, or other cross-section.

The cross-section of the tube 11, the number, and the dimensions of the superconductive elements 9 may be chosen in accordance with design requirements of the superconductor element itself, and as determined by the application for which it is to be used, the critical current, and the coefficient of stabilization, so that maximum cooling effect can be obtained with a minimum amount of refrigerating fluid being passed through the tube 11.

The dimensions, number of superconductive elements, and shapes can be varied to suit various design requirements.

We claim:

1. Method of manufacturing a superconductive structure adapted to be cooled by a cryogenic fluid, comprising:

- a fluid-tight metallic tube (5) adapted to contain said cryogenic fluid;
- a filamentary superconductor (3) located in said tube; and
- a metallic sheath having a lesser outside diameter than the inside diameter of said tube surrounding said semiconductor, said method comprising:

- providing an elongated metallic band (5*a*) having lateral edges extending along the length of the band, and a transverse dimension between the edges and across the width of the band;
- bonding the sheath (4) surrounding the superconductor along a substantial line contact at one side of the band along the length of said band and parallel to said edges, folding said band about the transverse dimension loosely around said sheath superconductor and forming said band into said tube, with said sheath superconductor inside; and
- securing the seam line along the lateral edges (7, 8) of the band together to be fluid-tight.

2. Method of manufacturing a superconductive structure according to claim 1, wherein the step of bonding the superconductor (4) comprises the step of welding the sheath surrounding the superconductor and the band together.

3. Method of manufacturing a superconductive structure according to claim 1, wherein the step of bonding the superconductor (4) comprises the step of fusing the metal of the sheath of the superconductor to the band.

4. Method of manufacturing a superconductive structure according to claim 1, wherein the step of securing the seam line comprises the step of welding the lateral edges of the band together.

5. Method of manufacturing a superconductive structure according to claim 1, wherein the step of securing the seam line comprises the step of cold flowing the lateral edges of the band together.

References Cited

UNITED STATES PATENTS

| | | | |
|---|---|---|---|
| 2,215,477 | 9/1940 | Pipkin | 29—423 X |
| 3,292,016 | 12/1962 | Kafka | 335—216 UX |
| 2,359,926 | 10/1944 | McCullough et al. | 29—157.3 C |
| 3,428,926 | 2/1969 | Bogner et al. | 174—126 X |
| 3,504,314 | 3/1970 | Anderson | 174—126 X |
| 3,527,876 | 9/1970 | Karvonen et al. | 29—599 X |

FOREIGN PATENTS

| | | | |
|---|---|---|---|
| 1,190,949 | 5/1970 | Great Britain | 29—599 |

JOHN F. CAMPBELL, Primary Examiner

D. C. REILEY, Assistant Examiner

U.S. Cl. X.R.

29—157.3; 174—126.2, DIG. 7; 335—216